US009491508B2

(12) United States Patent
Nielsen et al.

(10) Patent No.: US 9,491,508 B2
(45) Date of Patent: *Nov. 8, 2016

(54) METHODS AND APPARATUS TO DETECT CARRYING OF A PORTABLE AUDIENCE MEASUREMENT DEVICE

(71) Applicant: The Nielsen Company (US) LLC, Schaumburg, IL (US)

(72) Inventors: Christen V. Nielsen, Palm Harbor, FL (US); Daniel J. Nelson, Tampa, FL (US)

(73) Assignee: The Nielsen Company (US), LLC, New York, NY (US)

(*) Notice: Subject to any disclaimer, the term of this patent is extended or adjusted under 35 U.S.C. 154(b) by 7 days.

This patent is subject to a terminal disclaimer.

(21) Appl. No.: 14/447,980

(22) Filed: Jul. 31, 2014

(65) Prior Publication Data

US 2014/0344841 A1 Nov. 20, 2014

Related U.S. Application Data

(63) Continuation of application No. 12/234,458, filed on Sep. 19, 2008, now Pat. No. 8,843,948.

(51) Int. Cl.
*H04N 21/41* (2011.01)
*H04N 21/442* (2011.01)
*H04H 60/33* (2008.01)

(52) U.S. Cl.
CPC ........ *H04N 21/44218* (2013.01); *H04H 60/33* (2013.01); *H04N 21/4126* (2013.01)

(58) Field of Classification Search
CPC ...... H04H 60/21; H04H 60/33; H04H 60/61; H04N 21/4126; H04N 21/44218
See application file for complete search history.

(56) References Cited

U.S. PATENT DOCUMENTS

| | | | |
|---|---|---|---|
| 4,141,119 A | 2/1979 | Nodo | |
| 5,253,292 A | 10/1993 | Fluder et al. | |
| 5,483,276 A | 1/1996 | Brooks et al. | |
| 5,980,246 A | 11/1999 | Ramsay et al. | |
| 6,115,620 A | 9/2000 | Colonna et al. | |
| 6,229,445 B1 | 5/2001 | Wack | |
| 6,426,719 B1 | 7/2002 | Nagareda et al. | |
| 6,703,918 B1 | 3/2004 | Kita | |
| 6,774,796 B2 | 8/2004 | Smith | |
| 6,890,285 B2 | 5/2005 | Rahman et al. | |
| 7,034,282 B2 | 4/2006 | Oka et al. | |

(Continued)

OTHER PUBLICATIONS

The United States Patent and Trademark Office, "Non-Final Office Action," issued in connection with U.S. Appl. No. 12/260,775 on Feb. 3, 2011.

(Continued)

*Primary Examiner* — Randy Flynn
(74) *Attorney, Agent, or Firm* — Hanley, Flight & Zimmerman, LLC

(57) ABSTRACT

Methods and apparatus to detect carrying of a portable audience measurement device are disclosed herein. An example portable audience measurement device including a housing; a media detector in the housing to collect media exposure data; a hinge having an arm to rotate in response to an applied, the arm to secure the housing to an object associated with a person; a rotation sensor to detect a magnitude of rotation of the arm relative to the housing; and a detector to compare the magnitude of rotation of the arm to a threshold angle to determine whether the device is being carried by the person.

21 Claims, 8 Drawing Sheets

(56) References Cited

U.S. PATENT DOCUMENTS

| | | |
|---|---|---|
| 7,311,665 B2 | 12/2007 | Hawthorne et al. |
| 7,373,820 B1 | 5/2008 | James |
| 7,420,464 B2 | 9/2008 | Fitzgerald et al. |
| 7,471,987 B2 | 12/2008 | Crystal et al. |
| 7,623,823 B2 | 11/2009 | Zito et al. |
| 2003/0005430 A1 | 1/2003 | Kolessar |
| 2003/0171833 A1 | 9/2003 | Crystal et al. |
| 2004/0019463 A1 | 1/2004 | Kolessar et al. |
| 2004/0214594 A1 | 10/2004 | Holman, IV |
| 2005/0200476 A1 | 9/2005 | Forr et al. |
| 2005/0203798 A1 | 9/2005 | Jensen et al. |
| 2005/0234774 A1 | 10/2005 | Dupree |
| 2005/0243784 A1 | 11/2005 | Fitzgerald et al. |
| 2005/0268798 A1 | 12/2005 | Neuhauser et al. |
| 2005/0272015 A1 | 12/2005 | Jensen et al. |
| 2005/0272016 A1 | 12/2005 | Jensen et al. |
| 2005/0272017 A1 | 12/2005 | Neuhauser et al. |
| 2005/0272018 A1 | 12/2005 | Crystal et al. |
| 2005/0272019 A1 | 12/2005 | Crystal et al. |
| 2005/0273802 A1 | 12/2005 | Crystal et al. |
| 2006/0003732 A1 | 1/2006 | Neuhauser et al. |
| 2006/0028953 A1 | 2/2006 | Jensen et al. |
| 2006/0100003 A1 | 5/2006 | Kohri et al. |
| 2006/0168613 A1 | 7/2006 | Wood et al. |
| 2007/0133836 A1* | 6/2007 | Lee .................... H04M 1/05 381/370 |
| 2007/0294705 A1 | 12/2007 | Gopalakrishnan et al. |
| 2007/0294706 A1 | 12/2007 | Neuhauser et al. |
| 2008/0001704 A1 | 1/2008 | Roston |
| 2008/0010110 A1 | 1/2008 | Neuhauser et al. |
| 2008/0015820 A1 | 1/2008 | Kolessar et al. |
| 2008/0086533 A1 | 4/2008 | Neuhauser et al. |
| 2008/0091087 A1 | 4/2008 | Neuhauser et al. |
| 2008/0091451 A1 | 4/2008 | Crystal |
| 2008/0091762 A1 | 4/2008 | Neuhauser et al. |
| 2008/0109295 A1 | 5/2008 | McConochie et al. |
| 2008/0148309 A1 | 6/2008 | Wilcox et al. |
| 2008/0300822 A1* | 12/2008 | Kumagai ........... G01D 5/24409 702/151 |
| 2009/0026358 A1 | 1/2009 | Kassamakov et al. |
| 2010/0045455 A1* | 2/2010 | Mazzolini ............ G08B 13/14 340/521 |
| 2010/0102981 A1 | 4/2010 | Nielsen et al. |

OTHER PUBLICATIONS

The United States Patent and Trademark Office, "Notice of Allowance," issued in connection with U.S. Appl. No. 12/260,775 on Jun. 30, 2011.

The United States Patent and Trademark Office, "Office Action," issued in connection with U.S. Appl. No. 13/232,728 on Jan. 3, 2012.

The United States Patent and Trademark Office, "Notice of Allowance," issued in connection with U.S. Appl. No. 13/232,728 on Apr. 27, 2012.

The United States Patent and Trademark Office, "Supplemental Notice of Allowability," issued in connection with U.S. Appl. No. 12/260,775 on Sep. 9, 2011.

The United States Patent and Trademark Office, "Non-Final Office Action," issued in connection with U.S. Appl. No. 12/234,458 on Jun. 24, 2011.

The United States Patent and Trademark Office, "Final Office Action," issued in connection with U.S. Appl. No. 12/234,458 on Dec. 16, 2011.

The United States Patent and Trademark Office, "Non-Final Office Action," issued in connection with U.S. Appl. No. 12/234,458 on Nov. 6, 2013.

The United States Patent and Trademark Office, "Notice of Allowance," issued in connection with U.S. Appl. No. 12/234,458 on Apr. 29, 2014.

* cited by examiner

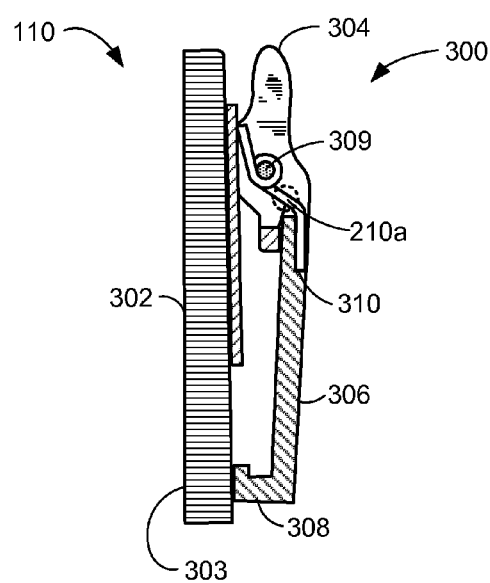 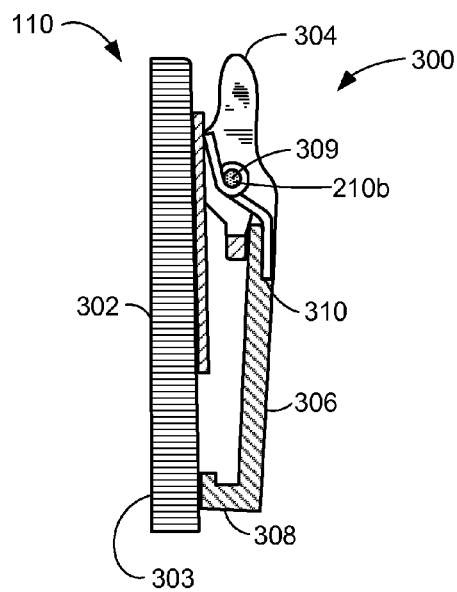
FIG. 3A  FIG. 3B
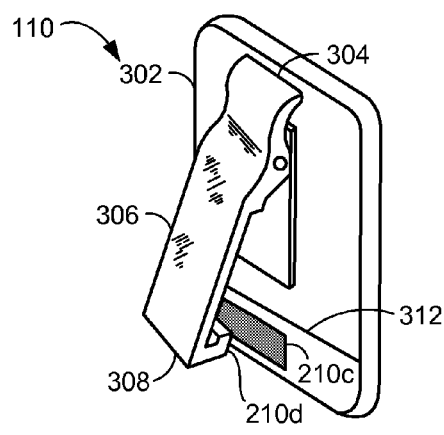 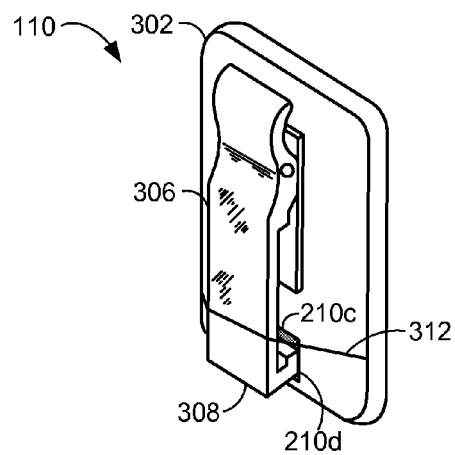
FIG. 3C  FIG. 3D

METHODS AND APPARATUS TO DETECT CARRYING OF A PORTABLE AUDIENCE MEASUREMENT DEVICE

RELATED APPLICATION

This patent arises from a continuation of U.S. patent application Ser. No. 12/234,458, filed Sep. 19, 2008, now U.S. Pat. No. 8,843,948, which is hereby incorporated herein by reference in its entirety.

FIELD OF THE DISCLOSURE

The present disclosure relates generally to audience measurement and, more particularly, to methods and apparatus to detect carrying of a portable audience measurement device.

BACKGROUND

Media-centric companies are often interested in tracking the number of times that audience members are exposed to media compositions (e.g., television programs, motion pictures, internet videos, radio programs, etc.). To track such exposures, companies often generate audio and/or video signatures (e.g., a representation of some, preferably unique, portion of the media composition or the signal used to transport the media composition) of media compositions that can be used to determine when those media compositions are presented to audience members. Additionally or alternatively, companies transmit identification codes (e.g., watermarks) with media compositions to monitor presentations of those media compositions to audience members by comparing identification codes retrieved from media compositions presented to audience members with reference identification codes stored in a reference database. The reference codes are stored in association with information descriptive of the corresponding media compositions to enable identification of the media compositions.

Audience measurement companies often enlist a plurality of panelists to cooperate in an audience measurement study for a length of time. For example, a panelist may be issued a portable metering device capable of collecting media exposure information indicative of the media to which the panelist is exposed. In such instances, the panelist agrees to carry the portable meter on their person at all times so that the portable meter is exposed to all of the media seen or heard by the panelist.

BRIEF DESCRIPTION OF THE DRAWINGS

FIG. 3A is a cross sectional illustration of an example implementation of the example portable meter of FIG. 2.

FIG. 3B is a cross sectional illustration of an example implementation of the example portable meter of FIG. 2.

FIG. 3C illustrates an example implementation of the example portable meter of FIG. 2 in an open position.

FIG. 3D illustrates the example portable meter of FIG. 3C in a closed position.

DETAILED DESCRIPTION

Figure 1:
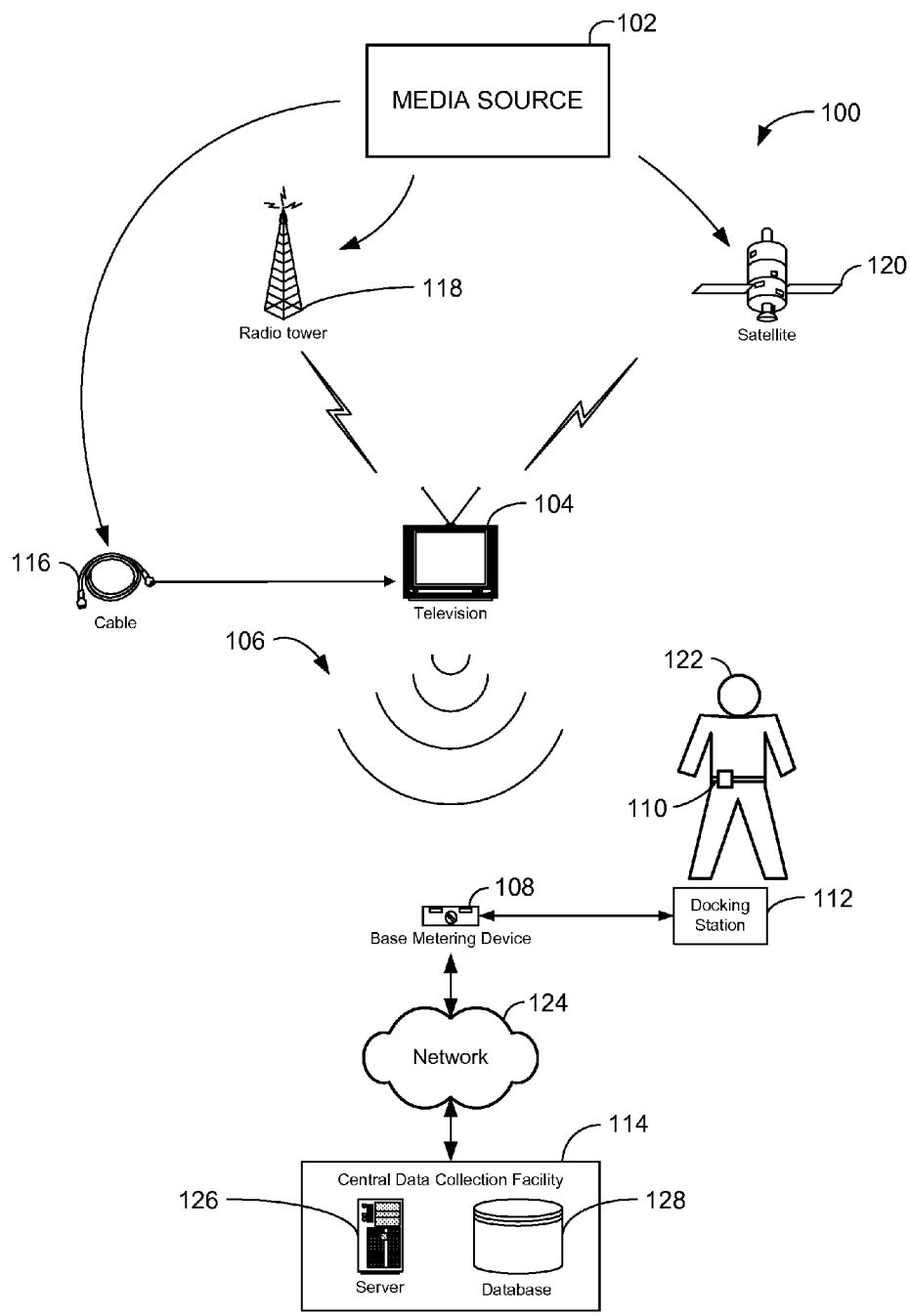
FIG. 1 is a block diagram of an example media exposure measurement system.

Although the following discloses example methods, apparatus, systems, and/or articles of manufacture including, among other components, firmware and/or software executed on hardware, it should be noted that such methods, apparatus, systems, and/or articles of manufacture are merely illustrative and should not be considered as limiting. For example, it is contemplated that any or all of these firmware, hardware, and/or software components could be embodied exclusively in hardware, exclusively in software, exclusively in firmware, or in any combination of hardware, software, and/or firmware. Accordingly, while the following describes example methods, apparatus, systems, and/or articles of manufacture, the examples provided are not the only way(s) to implement such methods, apparatus, systems, and/or articles of manufacture.

The example methods, apparatus, systems, and/or articles or manufacture described herein can be used to detect a status of a portable device such as, for example, a portable media measurement device (also referred to herein as a "portable meter"). To collect media exposure information, such a portable meter is configured to generate, detect, decode, and/or collect media identifying data (e.g., audio codes, video codes, audio signatures, video signatures, etc.) associated with media presentations to which the portable meter is exposed. If the portable meter is proximate a person at the time of exposure, it can be assumed that the person is also exposed to the media presentation. Thus, media measurement entities request participants in audience measurement panels to carry (e.g., wear on a piece of clothing such as a belt) portable meters on their person.

The data reflecting the media exposure of the panel participants is collected and used to statistically determine the size and/or demographics of an audience being exposed to certain media presentations. The process of enlisting and retaining the panel participants ("panelists") can be a difficult and costly aspect of the audience measurement process. For example, panelists must be carefully selected and screened for particular demographic characteristics so that the panel is representative of the population(s) of interest. In addition, the panelists selected must be diligent about wearing the portable meters so that the audience measurement data accurately reflects their media habits. Thus, it is advantageous to additionally collect panelist compliance information indicative of whether panelists are properly wearing or failing to wear the portable meters.

The example methods, apparatus, systems, and/or articles of manufacture described herein determine whether a panelist is wearing a portable meter by detecting a position of an attachment mechanism. For example, when a portable meter is configured to be attached to a panelist via an attachment mechanism such as a clip (e.g., to a belt or a piece of clothing), the status (e.g., open, closed, slightly open, grasping material, etc.) of the clip indicates whether the portable meter is currently attached to the panelist. To gather status information with respect to the attachment mechanism, one or more sensors are disposed on the portable meter and/or, more specifically, the attachment mechanism. In some example implementations, a strain gauge detects an actuation and/or a position of a spring that applies a force to a clip to bias the clip into an opened position that the attachment mechanism assumes if a clasp is not used to secure the meter on the panelist. In other example implementations, a strain gauge detects an actuation and/or a position of a spring that applies a force to a clip to bias the clip into a closed position. Additionally or alternatively, contact sensors can be placed on a body of the portable meter and an end of the clip/attachment mechanism to detect whether the clip is open or closed. Additionally or alternatively, a transducer can be placed on or near a hinge pin of the attachment mechanism to collect information related to a rotation of the hinge pin. The rotation information is used to determine an angle at which the clip is extended away from the portable meter.

The gathered status information can be used (e.g., by a server at a central facility or by processing components in the portable meter) to calculate a likelihood that the corresponding panelist is wearing the portable meter and/or to determine whether media exposure information collected by the meter should be credited to the panelist (e.g., counted as an instance of the panelist being exposed to the corresponding media content). If the panelist is not carrying the meter (e.g., the meter is left somewhere (e.g., on a table)), the exposure data collected by the meter at those times may not be reflective of an audience member exposure and, thus, the exposure should not be credited.

In the example of FIG. 1, an example media presentation system 100 including a media source 102 and a media presentation device 104 is metered using an example media measurement system 106. The measurement system 106 includes a base metering device 108, a portable metering device 110, a docking station 112, and a central facility 114. The media presentation device 104 is configured to receive media from the media source 102 via any of a plurality of transmission systems including, for example, a cable service provider 116, a radio frequency (RF) service provider 118, a satellite service provider 120, an Internet service provider (ISP) (not shown), or via any other analog and/or digital broadcast network, multicast network, and/or unicast network. Further, although the example media presentation device 104 of FIG. 1 is shown as a television, the example media measurement system 106 is capable of collecting information from any type of media presentation device including, for example, a personal computer, a laptop computer, a radio, a cinematic projector, an MP3 player, or any other audio and/or video presentation device or system.

The base metering device 108 of the illustrated example is configured as a primarily stationary device disposed on or near the media presentation device 104 and may be adapted to perform one or more of a plurality of metering methods (e.g., channel detection, collecting signatures and/or codes, etc.) to collect data concerning the media exposure of a panelist 122. Depending on the type(s) of metering that the base metering device 108 is adapted to perform, the base metering device 108 may be physically coupled to the presentation device 104 or may instead be configured to capture signals emitted externally by the presentation device 104 such that direct physical coupling to the presentation device 104 is not required. Preferably, a base metering device 108 is provided for each media presentation device disposed in a household, such that the base metering devices 108 may be adapted to capture data regarding all in-home media exposure for a group of household members.

Similarly, the portable metering device 110 is configured to perform one or more of a plurality of metering methods (e.g., collecting signatures and/or codes) to collect data concerning the media exposure of the panelist 122 carrying the device 110. In the illustrated example, the portable meter 110 is a portable electronic device such as, but not limited to, a portable (e.g., cellular) telephone, a personal digital assistant (PDA), and/or a handheld computer having the media measurement capabilities described herein integrated with other functionality (e.g., cellular telephone service, operating system platforms, email capabilities, etc.). Alternatively, the portable meter 110 may be dedicated to the media measurements described herein without including functionality that is unrelated to audience measurement. Because the portable meter 110 is assigned to a specific individual, the data it collects can be associated with a specific demographic population. To facilitate such association, the collected data is preferably associated with an identification that is unique to the portable meter 110 and/or the audience member to which the meter 110 is assigned.

The portable meter 110 of the illustrated example is capable of measuring media exposure that occurs both inside and outside a home. For example, the portable meter 110 is capable of detecting media to which the panelist 122 is exposed in places such as airports, shopping centers, retail establishments, restaurants, bars, sporting venues, automobiles, at a place of employment, movie theaters, etc. To gather such information, the panelist simply wears the portable meter 110 on his or her person (preferably at all times). As described in greater detail below in connection with FIGS. 2, 3A-D, 4, and 5A-B, the portable meter 110 of FIG. 1 is configured to implement the example methods and apparatus described herein to collect information indicative of the panelist carrying the portable meter 110.

In the example of FIG. 1, the base metering device 108 and the portable meter 110 are adapted to communicate with the remotely located central data collection facility 114 via a network 124. The network 124 may be implemented using any type of public or private network such as, but not limited to, the Internet, a telephone network, a local area network (LAN), a cable network, and/or a wireless network. To enable communication via the network 124, the base metering device 108 includes a communication interface that enables connection to an Ethernet, a digital subscriber line (DSL), a telephone line, a coaxial cable, or any wireless connection, etc. Likewise, the portable meter 110 includes an interface to enable communication by the portable metering device 110 via the network 124. In the illustrated example, either or both of the base metering device 108 and the portable metering device 110 are adapted to send collected media exposure data to the central data collection facility 114. Further, in the event that only one of the base metering device 108 and the portable metering device 110 is capable of transmitting data to the central data collection facility 114, the base and portable metering devices 108, 110 are adapted to communicate data to each other to provide a means by which collected data from all metering devices can be transmitted to the central data collection facility 114. The example central data collection facility 114 of FIG. 1 includes a server 126 and a database 128 to process and/or store data received from the base metering device 108 and/or the portable metering device 110 and/or other metering device(s) (not shown) used to measure other panelists. Of course, multiple servers and/or databases may be employed.

The example portable meter 110 of FIG. 1 communicates via the network 124 using the docking station 112. The docking station 112 has a cradle in which the portable metering device 110 is deposited to enable transfer of data via the network 124 and to enable a battery (not shown) disposed in the portable metering device 110 to be recharged. The docking station 112 is operatively coupled to the network 124 via, for example, an Ethernet connection, a digital subscriber line (DSL), a telephone line, a coaxial cable, etc. Additionally or alternatively, when the portable meter 110 is implemented as a cellular telephone, a PDA, or other similar communication devices, the portable meter 110 may be configured to utilize the communication abilities of the associated device (e.g., a cellular telephone communication module) to transmit data to the central facility.

Figure 2:
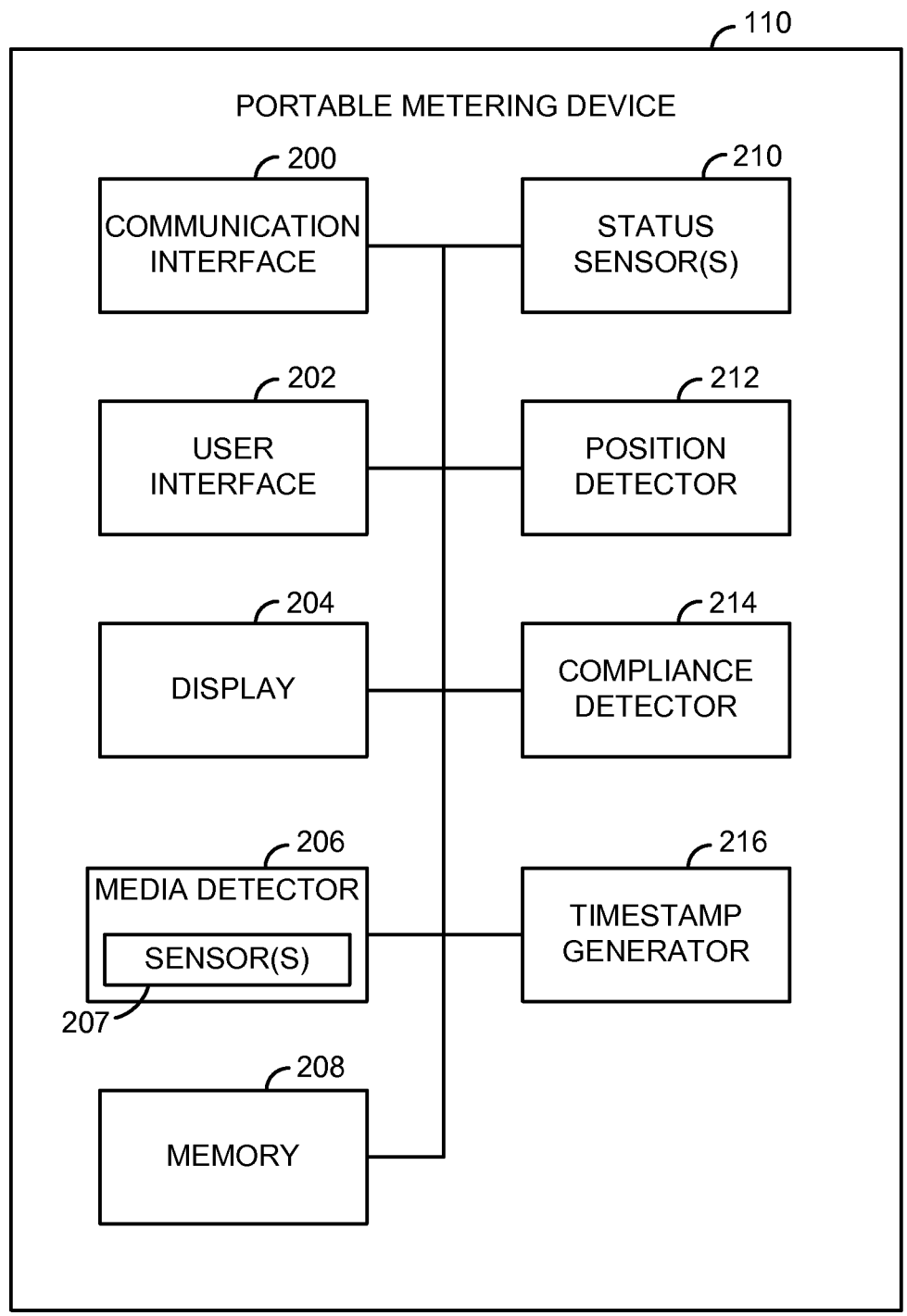
FIG. 2 is a block diagram of an example apparatus that may be used to implement the example portable metering device of FIG. 1.

FIG. 2 is a block diagram of an example apparatus that may be used to implement the example portable meter 110 of FIG. 1. In the illustrated example of FIG. 2, the example portable meter 110 includes a communication interface 200, a user interface 202, a display 204, a media detector 206, memory 208, one or more status sensors 210, a position detector 212, a compliance detector 214, and a timestamp generator 216. While an example manner of implementing the portable meter 110 of FIG. 1 has been illustrated in FIG. 2, one or more of the elements, processes and/or devices illustrated in FIG. 2 may be combined, divided, rearranged, omitted, eliminated and/or implemented in any other way. Further, the example communication interface 200, the example user interface 202, the example display 204, the example media detector 206, the example memory 208, the example status sensor(s) 210, the example position detector 212, the example compliance detector 214, the example timestamp generator 216, and/or, more generally, the example portable meter 110 of FIG. 2 may be implemented by hardware, software, firmware and/or any combination of hardware, software and/or firmware. Thus, for example, any of the example communication interface 200, the example user interface 202, the example display 204, the example media detector 206, the example memory 208, the example status sensor(s) 210, the example position detector 212, the example compliance detector 214, the example timestamp generator 216, and/or, more generally, the example portable meter 110 of FIG. 2 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended claims are read to cover a purely software and/or firmware implementation, at least one of the example communication interface 200, the example user interface 202, the example media detector 206, the example position detector 212, the example compliance detector 214, the example timestamp generator 216, and/or, more generally, the example portable meter 110 of FIG. 2 are hereby expressly defined to include a tangible medium such as a memory, DVD, CD, etc. storing the software and/or firmware. Further still, the example portable meter 110 of FIG. 2 may include one or more elements, processes and/or devices in addition to, or instead of, those illustrated in FIG. 2, and/or may include more than one of any or all of the illustrated elements, processes and devices.

The communication interface 200 of the illustrated example enables the portable meter 110 to convey and/or receive data to and/or from the other components of the media exposure measurement system 106 (FIG. 1). For example, the communication interface 200 enables communication between the portable meter 110 and the central facility 114, between the portable meter 110 and the base metering device 108, and/or between the portable meter 110 and the docking station 112. The communication interface 200 of FIG. 2 is implemented by, for example, an Ethernet card, a digital subscriber line, a coaxial cable, and/or any wireless connection.

The user interface 202 of the illustrated example is used by the panelist 122 (FIG. 1) to enter data (e.g., identity information associated with the panelist 122 and/or demographic data such as age, race, sex, household income, etc.) and/or commands into the portable meter 110. Entered data and/or commands are stored (e.g., in the memory (e.g., memory 724 and/or memory 725) of the example processor system 710 of FIG. 7) and may be subsequently transmitted to the base metering device 108 and/or the central facility 114. The user interface 202 of FIG. 2 is implemented by, for example, a keyboard, a mouse, a track pad, a track ball, and/or a voice recognition system.

The example display 204 of FIG. 2 is implemented using, for example, a light emitting diode (LED) display, a liquid crystal display (LCD), and/or any other suitable display configured to present visual information. For example, the display 204 conveys information associated with a log-in status of the panelist 122, media content being identified by the portable meter 110, status information (e.g., whether the attachment mechanism (e.g., a clip) is in an open or closed position), etc. Although the display 204 and the user interface 202 are shown as separate components in the example of FIG. 2, the display 204 and the user interface 202 may instead be integrated into a single component such as, for example, a touch-sensitive screen configured to enable interaction between the panelist 122 and the portable meter 110.

The example media detector 206 of FIG. 2 includes one or more sensors 207 (e.g., optical and/or audio sensors) configured to detect particular aspects of media to which the portable meter 110 is exposed. For example, the media detector 206 may be capable of collecting signatures and/or detecting codes (e.g., watermarks) of media content to which it is exposed by using a microphone to collect audio signals emitted by an information presentation device and processing the same to extract the code or generate the signature. Data gathered by the media detector 206 is stored in the memory 208 to identify the media to which the portable meter 110 is being exposed. The precise methods to collect media identifying information are irrelevant, as any methodology to collect audience measurement data may be employed without departing from the scope or spirit of this disclosure.

Generally, the example status sensor(s) 210 gather information related to the status of an attachment mechanism, such as a clip intended to be attached to a belt or piece of clothing of the panelist 122. Example sensors include, without limitation, open/close switches, strain gauges, pressure sensors, contact sensors, optical sensors, piezoelectric sensors, resistive and/or capacitive plates, mass detectors, and/or tilt sensors. The status sensor(s) 210 of the example of FIG. 2 are described in greater detail below in connection with FIGS. 3A-D, 4, and 5A-B. In some examples, the status sensor(s) 210 detect force (e.g., using a strain gauge) being applied to the attachment mechanism and/or a component thereof (e.g., a spring configured to bias the attachment mechanism to a close or open position). In some examples, the status sensor(s) determine an angular position (e.g., using a rotary encoder), relative to a starting point, of the attachment mechanism. In some examples, the status sensor(s) 210 detect whether an end of a component (e.g., an arm to be clipped to a piece of clothing) is in contact (e.g., using a mechanical contact sensor) with a body of the portable meter 110. Additionally or alternatively, the status sensor(s) 210 may detect one or more events corresponding to compliance-related activities, such as opening and/or closing of an attachment mechanism for the purpose of fixing or removing the portable meter 110 to or from an article of clothing, such as a belt.

The example position detector 212 interprets the data collected by the status sensor(s) 210 to determine a position (e.g., open, closed, slightly open, slightly closed, and/or an angle of extension) of the attachment mechanism. For example, data related to a force being applied to a spring of the attachment mechanism may be interpreted by the position detector 212 to correlate to a certain position (e.g., open, closed, halfway open, etc.) according to, for example, a lookup table programmed in the position detector 212. In other examples, data related to a rotation of a component (e.g., a hinge pin) and the angular position thereof may be interpreted by the position detector 212 to correlate to an angle at which the attachment mechanism is extending away from a body of the portable meter 110. In some examples, data related to whether a component (e.g., a clip) of the attachment mechanism is in contact with the body of the portable meter 110 is interpreted by the position detector 212 to indicate that the attachment mechanism is open or closed. The example position detector 212 generates signals corresponding to the results of the position calculations and stores the same in the memory 208 and/or conveys the signals to the compliance detector 214.

In the illustrated example, the timestamp generator 216 is configured to generate timestamps indicating the date and/or time at which, for example, (1) the status sensor(s) 210 take a reading or detect a change in the status of the portable meter 110, (2) the media detector 206 detects exposure to media, (3) the panelist 122 enters data and/or a command into the portable meter 110, (4) the portable meter 110 communicates with the base metering device 108 and/or the central facility 114, (5) the position detector 212 generates a position-related results, and/or (6) any other notable event. Additionally or alternatively, the timestamp generator 216 may generate timestamp(s) representative of a duration during which a status (e.g., an open or closed position of a clip or clasp) of the portable meter 110 is detected.

The compliance detector 214 receives the results generated by the position detector 212 and determines a likelihood that the panelist 122 is wearing the portable meter 110 and, thus, whether the audience measurement data collected by the media detector 206 of the portable meter 110 should be credited as valid. To calculate the likelihood of the portable meter 110 being worn for a given period of time, the compliance detector 214 counts a number of compliance indications that were detected over the given period of time as defined by the timestamps assigned to the data collected by the status sensor(s) 210 and analyzed by the position detector 212. Signals qualifying as compliance indications vary according to the type of status sensor being used by the portable meter 110. For example, when the status sensor(s) 210 include a contact sensor, compliance indications include signals corresponding to the attachment mechanism not being in contact with a body of the portable meter 110. Other example compliance indications are described below in connection with FIGS. 3A-D, which illustrates a plurality of different types of sensors.

Using the number of compliance indications, the compliance detector 214 generates a frequency to indicate how often the portable meter 110 was in a position consistent with that of a portable meter being worn by a person. The compliance detector 214 then correlates the frequency (e.g., in a lookup table or according to a translation equation) to a likelihood (e.g., a percentage) that can be compared to a threshold. In the illustrated example, meeting or exceeding the threshold for a given period of time causes any media measurement information collected by the media detector 206 during the given period of time to be credited as valid.

The calculations performed by the compliance detector 214 described herein may additionally or alternatively be performed at the central facility 114 (e.g., by the analysis server 126), which, in such instances, receives the results from the position detector 212 and/or the status sensor(s) 210 via the communication interface 200. In such examples, the compliance detector 214 is eliminated from the portable meter 110 and located at the central facility 114. In other examples, some of the functions of the compliance detector 214 described herein may be performed at the portable meter 110, while the remainder of the functions are performed at the central facility 114. In such instances, both the portable meter 110 and the central facility 114 include a compliance detector 214 and the functions performed by each of the compliance detectors 214 are known to the other.

FIG. 3A is a cross sectional illustration of an example implementation of the example portable meter 110 of FIG. 2. In the illustrated example, the portable meter 110 includes an attachment mechanism 300, which is shown as a clip in FIG. 3A. The clip 300 is mounted to a body 302 of the portable meter 110, which houses the electronic components described above in connection with FIG. 2 (e.g., the communication interface 200, the user interface 202, the display 204, the media detector 206, the memory 208, the status sensor(s) 210, the position detector 212, the compliance detector 214, and/or the timestamp generator 216). In the illustrated example, the media sensors 207 are positioned on a front side 303 of the body 302. In other examples, the media sensors 207 may be positioned in other locations to enable the collection of media information as described above.

The clip 300 may be mounted to the body 302 in any of a plurality of manners, such as via an adhesive, by a pin, or by integrally forming the clip 300 as part of the body 302. The clip 300 includes an actuator 304, an elongated arm 306 having a hook 308 extending therefrom, and a spring 310. To open the clip 300, the panelist 122 applies a force to the actuator 304 toward the body 302. In response, the elongated arm 306 extends away from the body 302 about an axis defined by a hinge pin 309 on which the spring 310 is seated, thereby creating space between the hook 308 and the body 302. An article of clothing, such as a belt, or other material carried by a person, such as a purse, can then be inserted between the elongated arm 306 and the body 302, thereby securing the meter 110 to the person. When the belt or other object has been inserted, the panelist 122 releases the actuator 304, allowing the spring 310 to force the elongated arm 306 back toward the body 302. The hook 308 then retains the belt within the clip 300. While the spring 310 biases the elongated arm 306 into a closed position in the illustrated example, other examples may include a spring that biases the elongated arm 306 into an open position. In such instances, a clasp or other retaining mechanism may be coupled to the body 302 to maintain the elongated arm 306 in a closed position.

The space between the body 302 and the elongated arm 306 is preferably smaller than the thickness of a belt. As a result, when a belt or an article of clothing is disposed within the clip 300, the spring 310 experiences a different tension or force than the tension of force experienced when the clip 300 is completely closed. Thus, one of the status sensor(s) 210 (FIG. 2) is disposed to detect the varying tension of the spring 310. In the illustrated example of FIG. 3A, a first sensor 210a (referred to herein as the spring sensor) is coupled to the spring 310 at a point near the elongated arm 306. In other examples, the spring sensor 210a may be coupled to the spring 310 at one or more other location(s) and/or to other components of the clip 300 capable of indicating a tension or force experienced by the spring 310.

In the illustrated example, the spring sensor 210a is implemented using a strain gauge (e.g., along a curved portion of the spring 310), which utilizes the deformation of a material (e.g., a metal foil) to measure a force experienced by the spring 310. In particular, different levels of force cause different levels of deformation of the material. The deformation results in a change in the electrical resistance of the material, which the strain gauge uses to generate a corresponding electrical signal. Other types of force and/or or pressure sensors (e.g., piezoelectric sensors, variable capacitance sensors, contact sensors, optical sensors, resistive and/or capacitive plates, mass detectors, and/or tilt sensors) capable of converting a mechanical force into an electrical output signal can be used.

Further, the spring sensor 210a is operatively coupled to the position detector 212 (FIG. 2), which interprets the electrical output of the spring sensor 210a to, for example, a value representative of the force or tension experienced by the spring 310. For example, when an actuation force of a threshold magnitude is detected by the spring sensor 210a and interpreted by the position detector 212, a record indicating that the panelist 122 either opened or closed the clip 300 at a certain time (e.g., as indicated by a timestamp generated by the timestamp generator 216 of FIG. 2) is generated by the position detector 212 and stored in the memory 208. The record is accessed by the compliance detector 214 and/or the server 126 at the central facility 114 and utilized as an indication of the status of the portable meter 110 (e.g., as a compliance indication). As described in greater detail below in connection with FIGS. 5A and 5B, the position information can be used to determine a likelihood that the panelist 122 was wearing the portable meter 110 during a given period of time.

FIG. 3B illustrates an example implementation of the example portable meter 110 of FIG. 2. The illustrated example of FIG. 3B includes components similar to those of the example portable meter 110 illustrated in FIG. 3A. These common components are labeled with the same reference numerals in FIG. 3B as they are in FIG. 3A and not re-described here for purposes of brevity.

As described above, a force applied to the actuator 304 causes the elongated arm 306 to extend away from the body 302 of the portable meter 110. The axis of the extension of the elongated arm 306 is the hinge pin 309. As the force applied to the actuator 304 increases, so does the gap between the elongated arm 306 and the body 302 of the portable meter 110. Thus, the angle at which the elongated arm 306 extends from the body 302 and, thus, the degree at which the clip 302 can be determined with reference to angular information related to the hinge pin 309. Therefore, one of the status sensor(s) 210 (FIG. 2) is disposed on or near the hinge pin 309. In the illustrated example of FIG. 3B, a second sensor 210b (referred to herein as the hinge sensor) is disposed on an end of the hinge pin 309. In other examples, the hinge sensor 210b may be disposed at one or more other location(s) and/or to other components of the clip 300 capable of indicating an angular position of the elongated arm 306.

Figure 6:
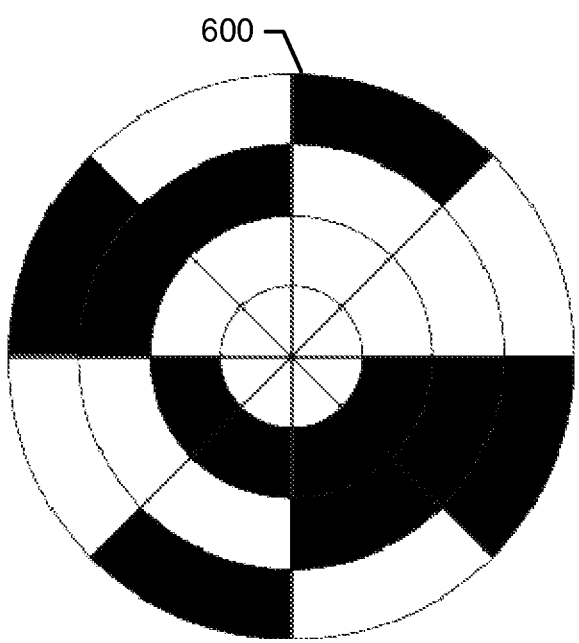
FIG. 6 illustrates an example patterned disc having a light/dark pattern to be included in a optical rotary indicator.

In the illustrated example, the hinge sensor 210b is implemented using an optical rotary indicator. Briefly, the optical rotary indicator includes a patterned rotating disc through which light from a light source (e.g., one or more light emitting diode (LED)) passes. An example patterned disc 600 to be included in the optical rotary indicator is illustrated in FIG. 6. As the patterned disk rotates, a light/dark pattern is generated, which can be read and processed by a photodetector (e.g., a photodiode array). The photodetector converts the reflected light to electrical signals representative of the light/dark pattern. The output of the photodetector is conveyed to the position detector 212. The position detector 212 translates the signals into information indicative of the annular speed, direction of rotation, magnitude of rotation, etc. associated with the hinge pin 309. Other types of sensors (e.g., piezoelectric sensors, variable capacitance sensors, contact sensors, optical sensors, resistive and/or capacitive plates, mass detectors, and/or tilt sensors) capable of detecting the rotational information related to the clip 302 and converting such information into an electrical output signal can be used.

Further, the hinge sensor 210b is operatively coupled to the position detector 212 (FIG. 2), which interprets the electrical output of the hinge sensor 210b to, for example, a value representative of the current rotational position of the elongated arm 306. For example, when an angular displacement of the hinge pin 309 of a certain magnitude is detected by the hinge sensor 210b and interpreted by the position detector 212, a record indicating that the elongated arm is open to a corresponding degree (e.g., thirty degrees from a closed position) at a certain time (e.g., as indicated by a timestamp generated by the timestamp generator 216 of FIG. 2) is generated by the position detector 212 and stored in the memory 208. The record is accessed by the compliance detector 214 and/or the server 126 at the central facility 114 and utilized as an indication of the status of the portable meter 110 (e.g., as a compliance indication if the degree at which the elongated arm 306 is extended exceeds a threshold). As described in greater detail below in connection with FIGS. 5A and 5B, the position information can be used to determine a likelihood that the panelist 122 was wearing the portable meter 110 during a given period of time.

FIG. 3C illustrates an example implementation of the example portable meter 110 of FIG. 2 with the clip 300 shown in an open position. The illustrated example of FIG. 3C includes components similar to those of the example portable meter 110 illustrated in FIG. 3A. These common components are labeled with the same reference numerals in FIG. 3C as they are in FIG. 3A and not re-described here for purposes of brevity. However, unlike the spring 310 in the example of FIG. 3A, the spring in the example of FIG. 3C biases the elongated arm 306 into the open position shown in FIG. 3C. In addition to the components described in connection with FIG. 3A, the example of FIG. 3C includes a clasp 312 (e.g., a retaining band) coupled to the body 302 of the meter 110. As discussed below in connection with FIG. 3D, the clasp 312 is placed around the elongated arm 306 when the clip 300 is in a closed position to retain the clip in the closed position.

The portable meter 110 is shown in FIG. 3C having the elongated arm 306 extending away from the body 302 at an angle in response to the biasing of the spring 310. Instead of or in addition to the spring sensor 210a of FIG. 3A and/or the hinge sensor 210b of FIG. 3B, the illustrated example of FIG. 3C includes a sensor 210c (referred to herein as the body sensor) disposed on the back of the body 302 and a sensor 210d (referred to herein as the hook sensor) disposed on the face of the hook 308 that engages the back of the body 302. As shown in FIGS. 3C-D, the body sensor 210c is disposed on the body 302 in juxtaposition with the hook sensor 210d such that the body sensor 210c and the hook sensor 210d cooperate to detect closure of the clip 300. In the illustrated example, the sensors 210c-d are implemented by contact sensors capable of generating a signal indicating that the two sensors 210c-d are in contact with each other. For example, the sensors 210c-d may include capacitive plates that generate a signal when electrical contact is established between the plates. Other types of sensors (e.g., piezoelectric sensors, optical sensors, resistivity-sensitive plates, etc.) capable of converting a mechanical force, such as a contact pressure applied by the hook 308 to the body 302, into an electrical output signal can be used.

Further, the body sensor 210c and the hook sensor 210d of FIG. 3C are operatively coupled to the position detector 212, which converts the electrical output of the sensors 210c-d to, for example, a value (e.g., a logic '1' or '0') representative of the hook 308 being in or out of contact with the body 302. For example, when the body sensor 210c is determined to be in contact with the hook sensor 210d (as shown in FIG. 3D), a record indicating that the clip 302 is closed at a certain time (e.g., as indicated by a timestamp of the timestamp generator 216 of FIG. 2) is generated by the position detector 212 and stored in the memory 208. Alternatively, when the body sensor 210c is determined to be out of contact with the hook sensor 210d (as shown in FIG. 3C), a record indicating that the clip 302 is open at a certain time (e.g., as indicated by a timestamp generated by the timestamp generator 216 of FIG. 2) is generated by the position detector 212 and stored in the memory 208. The record is accessed by the compliance detector 214 and/or the server 126 at the central facility 114 and utilized as an indication of the status of the portable meter 110. In the case of the spring biasing the clip 300 in an open position, as shown in FIGS. 3C and 3D, the status indication is a compliance indication if the contact sensors 210c-d are in contact and a non-compliance indication if the contact sensors 210c-d are not in contact. In other examples, such as when the spring 310 biases the elongated arm 306 into a closed position, the status indication may be interpreted differently (e.g., as a compliance indication if the contact sensors 210c-d are not in contact and a non-compliance indication if the contact sensors 210c-d are in contact). As described in greater detail below in connection with FIG. 5A and 5B, the position information can be used to determine a likelihood that the panelist 122 was wearing the portable meter 110 during a given period of time.

Although the examples of FIGS. 3C and 3D utilize the spring 310 that biases the clip 300 to a open position, other implementations are contemplated. For example, implementations when the spring 310 biases the clip 300 to an closed position are contemplated. In such implementations, detection of the clip 300 in angled position (e.g., a position in which the elongated arm 306 is almost, but not entirely, closed) may be indicative of the clip 300 being fastened to an object such as a belt, purse string, or article or clothing. However, the approach illustrated in FIGS. 3C and 3D is advantageous in that the portable meter 110 being left on a table is easily detected by the fact that the clip 300 is open and in that a variety of belt sizes, clothing sizes, etc. need not be accounted for (e.g., in a biased closed approach some belts may not hold the clip 300 open while others may not allow the clip 300 to close).

In addition to, or instead of, the sensors 210a-d shown in the illustrated examples of FIGS. 3A-D, the status of the portable meter 110 may be detected using alternative or additional types of sensor(s) placed in alternative or additional locations and/or coupled to alternative or additional components of the portable meter 110 and/or the attachment mechanism 300. Further, when the portable meter 110 includes more than one type of status sensor, the compliance indications described above may be used independently and/or together to calculate one or more likelihoods and/or conclusions regarding the wearing of the portable meter 110 by the panelist 122. For example, detection that the panelist 122 applied a force to the actuator 304 at a certain time may indicate that the portable meter is being worn. Then, a subsequent reading taken after the detection of the actuation force indicating that the hook 308 is in contact with the body 302 (e.g., in the case of a thick belt that prevents complete closure of the hook 308) may serve as a confirmation (in the case that the spring biases the clip in an open position) or, at least, an increased likelihood that the portable meter 110 is being worn.

Further, the time between affirmative readings (e.g., indicative that the portable meter 110 is being worn) may be considered in the likelihood calculation. For example, while a reading that the hook 308 is in contact with the body 302 indicates a likelihood that the portable meter 110 is being worn (in the case that the spring 310 biases the clip 300 in an open position), if there is no change in that reading for a long duration of time (e.g., more than one or two days), the likelihood of compliance can decrease because it is likely that the panelist 122 changed clothes at least once per day. In such instances, the chances that the clip 300 is in an open (or closed) position for some other reason than compliance (e.g., the clip 300 is attached to a desk or other piece of furniture, the meter is on a belt hanging in a closet, etc.) are taken into account in the calculations performed by the compliance detector 214 and/or the server 126 at the central facility 114.

Figure 4:
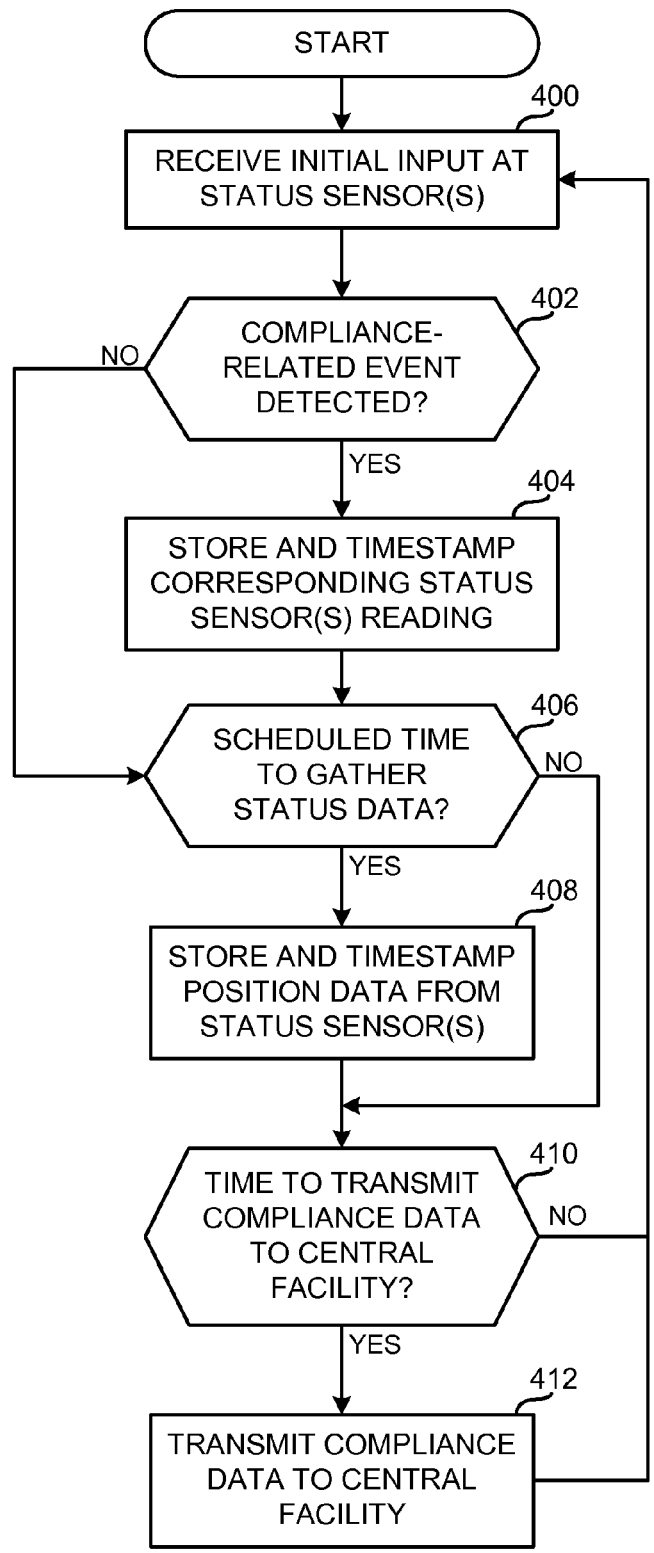
FIG. 4 is a flow diagram representative of example machine readable instructions that may be executed to implement the example portable meter of FIG. 1 to collect media exposure information including a status of the example portable meter.
Figure 5A:
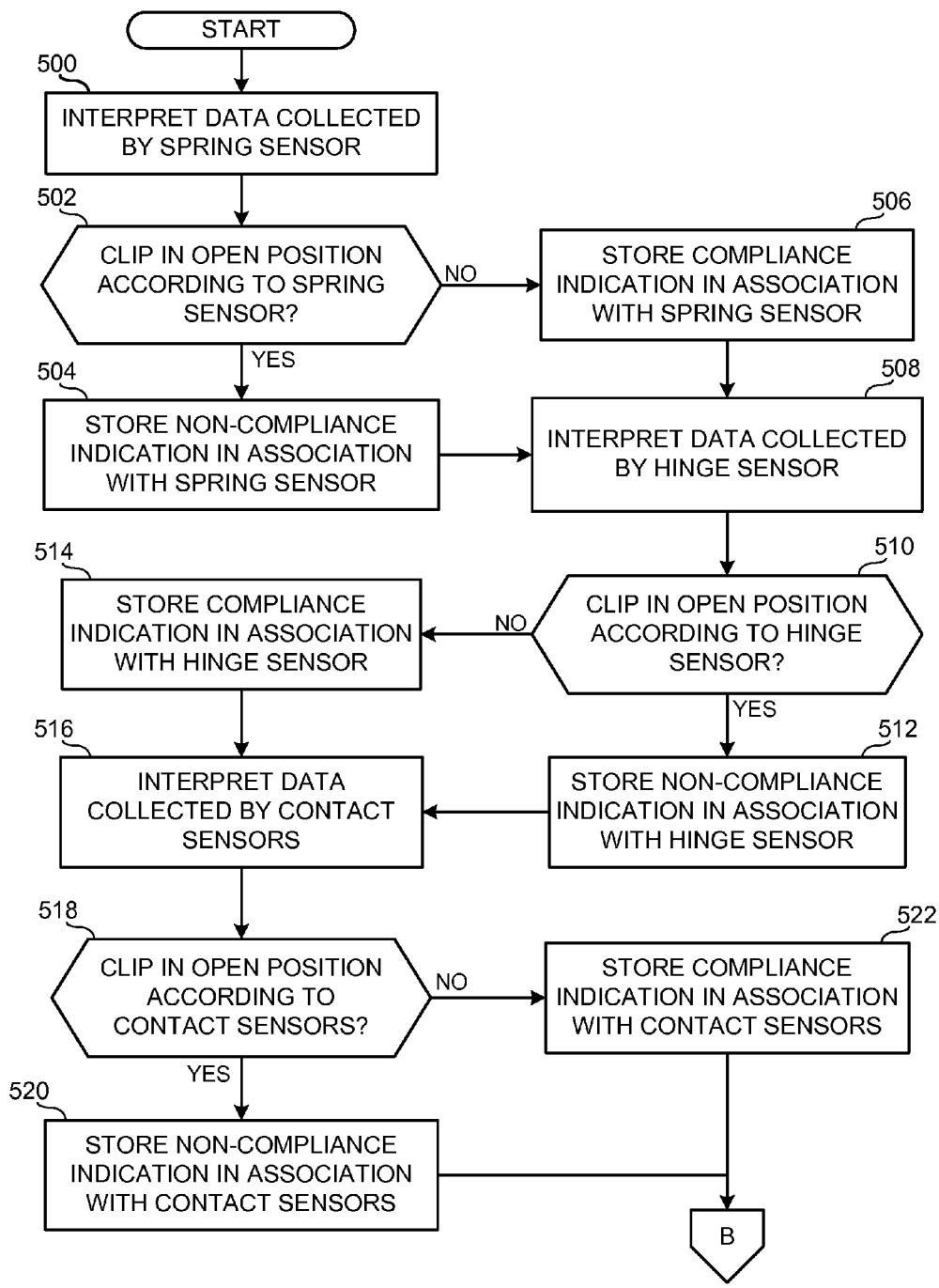
FIGS. 5A and 5B are a flow diagram representative of example machine readable instructions that may be executed to implement the example portable meter of FIG. 1 to calculate a likelihood that a panelist is wearing the portable meter.
Figure 5B:
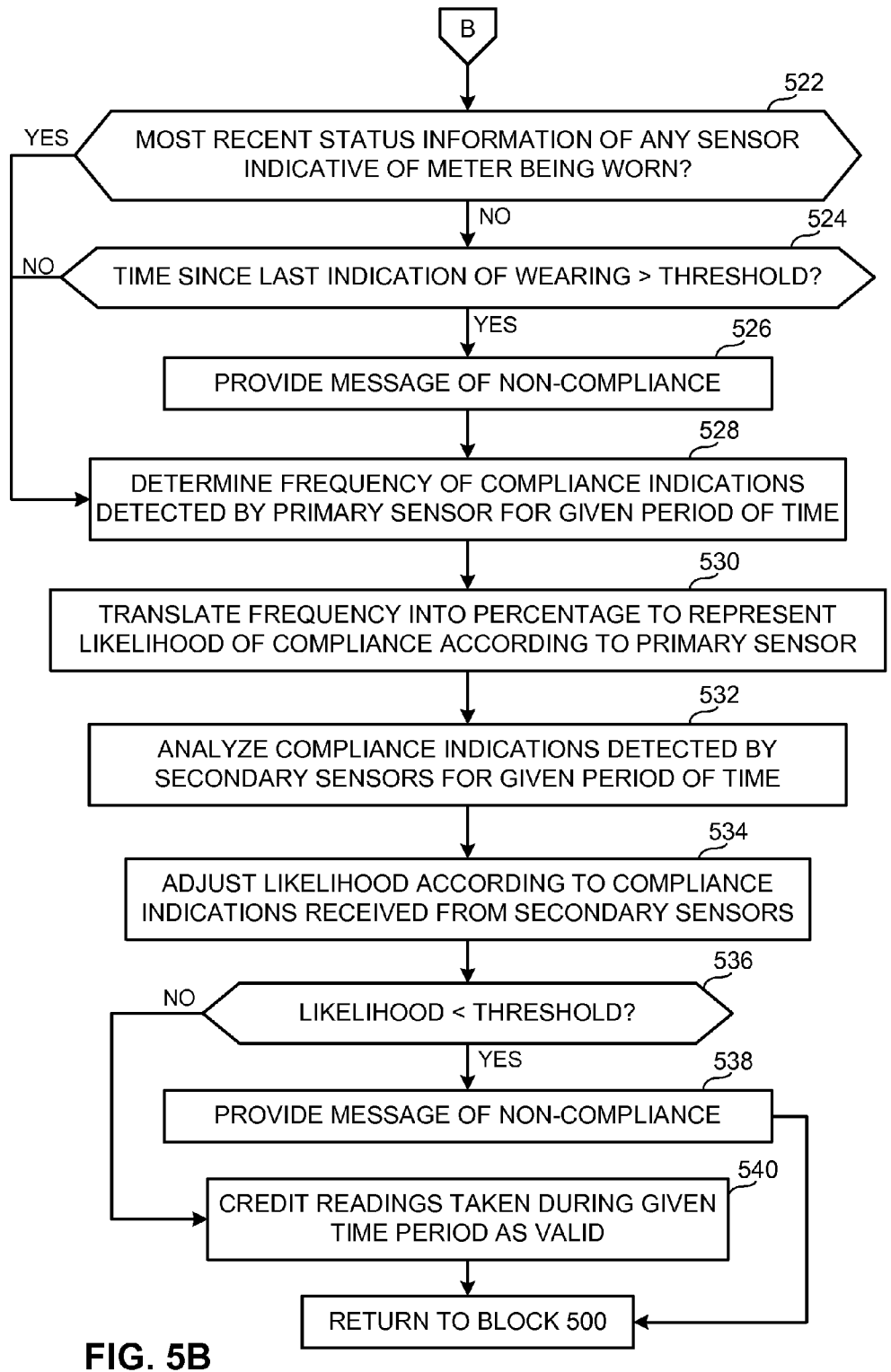

The flow diagrams depicted in FIGS. 4 and 5A-B are representative of machine readable instructions that can be executed to implement the example methods and apparatus described herein. The example machine readable instructions of FIGS. 4 and 5A-B correspond to an example implementation of the example portable meter 110 of FIG. 2 in which the status sensor(s) 210 include the spring sensor 210a described in FIG. 3A, the hinge sensor 210b described in FIG. 3B, and the body sensor 210c and the hook sensor 210d described in connection with FIG. 3C-D. Other example implementations including different configuration(s) of status sensors may call for additional, fewer, and/or alternative machine readable instructions. Moreover, while the example machine readable instructions of FIGS. 4 and 5A-B illustrate one or more interactions and/or dependencies among the sensors 210a-d, other example implementations may include each of the sensors 210a-d acting independently of one another and/or the functionality (e.g., calculations, processing, etc.) of any component (e.g., the compliance detector 214) being performed using readings from only one of the sensors 210a-d. In such instances, the compliance detector 214 calculates a likelihood of compliance based on each sensor 210a-d, without influence from any other one of the sensors 210a-d. In some instances, readings from a first subset of the sensors 210a-d (e.g., the spring sensor 210a and the contact sensors 210c-d or the hinge sensor 210b and the contact sensors 210c-d) may interact to form the likelihood of compliance, while readings from a second subset of the sensors 210a-d may not interact with one another or the first subset to form the likelihood of compliance. Further, in some implementations, the output of the sensors 210a-d may be weighted differently so that different sensor outputs have more or less influence on the likelihood calculation.

The example processes of FIGS. 4 and/or 5A-B may be performed using a processor, a controller and/or any other suitable processing device. For example, the example processes of FIGS. 4 and/or 5A-B may be implemented in coded instructions stored on a tangible medium such as a flash memory, a read-only memory (ROM) and/or random-access memory (RAM) associated with a processor (e.g., the example processor 712 discussed below in connection with FIG. 7). Alternatively, some or all of the example processes of FIG. 4 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, some or all of the example processes of FIGS. 4 and/or 5A-B may be implemented manually or as any combination(s) of any of the foregoing techniques, for example, any combination of firmware, software, discrete logic and/or hardware. Further, although the example processes of FIGS. 4 and 5A-B are described with reference to the flow diagrams of FIGS. 4 and 5A-B, other methods of implementing the processes of FIG. 4 may be employed. For example, the order of execution of the blocks may be changed, and/or some of the blocks described may be changed, eliminated, sub-divided, or combined. Additionally, any or all of the example processes of FIGS. 4 and 5A-B may be performed sequentially and/or in parallel by, for example, separate processing threads, processors, devices, discrete logic, circuits, etc.

FIG. 4 depicts a flow diagram representative of machine readable instructions that may be executed to implement the example portable meter 110 of FIG. 2 to collect compliance information. Each of the status sensors 210a-d (e.g., the spring sensor 210a coupled to the spring 310, the hinge sensor 210b disposed on or near the hinge pin 309, and the contact sensors 210c-d coupled to the body 302 and the hook 308, respectively) takes an initial reading at the onset (e.g., powering up, turning on, or resetting) of operation (block 400). The readings taken by each sensor 210a-d are associated with the status (e.g., open, closed, an angle of extension, etc.) of the attachment mechanism 300 (FIGS. 3A-D) of the portable meter 110 and/or a force or tension experienced by the attachment mechanism 300. In some example situations, the readings may be related to a compliance-related event, such as an opening or closing of the attachment mechanism 300 (as detected by a force sensed by the spring sensor 210a and/or a change in contact status between the hook 308 and the body as detected by the contact sensors 210c-d), a change in the angle of extension of the elongated arm 306 from the body 302 (as detected by a rotation sensed by the hinge sensor 210b), or any other change in state of the sensors 210a-d. If such a compliance-related event is detected (block 402), the corresponding sensor reading is stored in the memory 208 and timestamped by the timestamp generator 216 to indicate a time and/or date at which the compliance-related event took place (block 404).

After any data corresponding to a detected compliance-related event is stored (block 404), or if no compliance-related event is detected (block 402), the status sensors 210a-d determine whether a scheduled time to take a reading has occurred (block 406). For example, in addition to detecting compliance-related events (e.g., changes in the status of the attachment mechanism 300), the example portable meter 110 of FIG. 2 implements a schedule (e.g., stored in the memory 208) of prompts to one or more of the status sensors 210a-d to take a reading. In the example implementation illustrated in FIGS. 4 and 5A-B, the scheduled readings include readings taken from each of the sensors 210a-d (e.g., detecting a force applied to the spring 310 via the spring sensor 210a, detecting an angle of extension of the elongated arm 306 via the hinge sensor 210b, and detecting whether the hook 308 is in contact with the body 302 via the contact sensors 210c-d). However, in other examples, the scheduled readings may include a subset of readings taken by a subset (e.g., the body sensor 210c and the hook sensor 210d) of the sensors 210a-d. If a reading prompt is scheduled, each of the scheduled status sensors 210a-d takes a reading as described above in FIGS. 3A-D and stores the corresponding data, which is timestamped by the timestamp generator 216, in the memory 208 (block 408).

After any data corresponding to a scheduled reading is stored, or if no reading is scheduled at block 406, the portable meter 110 determines whether an event or scheduled time to transmit stored compliance information to the central facility 114 (FIG. 1) has occurred (block 410). For example, the example portable meter 110 of FIG. 2 is programmed (e.g., in a program stored in the memory 208) to transmit compliance data (and/or media exposure measurement data) to the central facility 114 each day at an early hour (e.g., three o'clock in the morning), when the panelist 122 (FIG. 1) is likely to be sleeping and/or not using the portable meter 110. Alternatively, the meter 110 may be programmed to transmit its data when certain events such as a "memory full" or a "memory more than X percent full" event occurs. If such a time of day or event has occurred and the meter 110 is capable of transmitting data, the portable meter 110 transmits any collected and/or stored compliance information via the communication interface 200 (FIG. 2) (block 412). For example, the portable meter 110 may be wirelessly connected to the base metering device 108 (FIG. 1) and/or the central facility 114 and may wirelessly transmit compliance information via a wireless communication module of the communication interface 200. Alternatively, when the portable meter 110 is docked in the docking station 112 (FIG. 1) when the scheduled transmission time occurs, the compliance information may be transmitted to the central facility 114 and/or the base metering device 108 via a wired module of the communication interface 200. After the compliance data is transmitted to the central facility 114, or if the time to transmit the compliance data has not occurred, control returns to block 400.

FIGS. 5A and 5B depict a flow diagram representative of machine readable instructions that may be executed to implement the example portable meter 110 of FIG. 2 to calculate a likelihood that a panelist is wearing the portable meter 110. Initially, the position detector 212 interprets the data collected by the status sensors 210a-d to determine a position (e.g., open, closed, slightly open, slightly closed, and/or an angle of extension) of the attachment mechanism 300 according to each of the sensors 210a-d.

In the illustrated example, the position detector 212 performs a first interpretation of data (e.g., information related to a detected compliance-related event at block 404 of FIG. 4 and/or information related to a scheduled reading taken at block 406 of FIG. 4) collected by the spring sensor 210a (block 500). As described above, data related to a force being applied to the spring 310 of the attachment mechanism 300 may be interpreted by the position detector 212 to correlate to a certain position (e.g., open, closed, halfway open, etc.) according to, for example, a lookup table programmed in the position detector 212. In the illustrated example, the spring 310 biases the elongated arm 306 open. Thus, if the first interpretation indicates that the clip 300 is in an open position (block 502), the position detector 212 generates a signal to store a non-compliance value (e.g., a logic '0') in the memory 208 associated with the spring sensor 210a (block 504). Otherwise, if the first interpretation indicates that the clip 300 is in a closed open position (block 502), the position detector 212 generates a signal to store a compliance value (e.g., a logic '1') in the memory 208 associated with the spring sensor 210a (block 506). Irrespective of which type of value (e.g., non-compliance or compliance) is associated with the spring sensor 210a, a timestamp generated by the timestamp generator 216 is also stored in association with the spring sensor 210a in the memory 208 to indicate a date and/or time at which the first interpretation was performed by the position detector 212.

Further, the position detector 212 performs a second interpretation of data (e.g., information related to a detected compliance-related event at block 404 of FIG. 4 and/or information related to a scheduled reading taken at block 406 of FIG. 4) collected by the hinge sensor 210b (block 508). As described above, data related to the angular position of the hinge pin 309 may be interpreted by the position detector 212 to correlate to an angle at which the elongated arm 306 is extending away from the body 302 of the portable meter 110. If the second interpretation indicates that the clip 300 is at an angle corresponding to an open position (block 510), the position detector 212 generates a signal to store a non-compliance value (e.g., a logic '0') in the memory 208 associated with the hinge sensor 210b (block 512). Otherwise, if the second interpretation indicates that the clip 300 is in an open position (block 510), the position detector 212 generates a signal to store a compliance value (e.g., a logic '1') in the memory 208 associated with the hinge sensor 210b (block 514). Irrespective of which type of value (e.g., non-compliance or compliance) is associated with the hinge sensor 210b, a timestamp generated by the timestamp generator 216 is also stored in association with the hinge sensor 210b in the memory 208 to indicate a date and/or time at which the first interpretation was performed by the position detector 212.

Further, the position detector 212 performs a third interpretation of data (e.g., information related to a detected compliance-related event at block 404 of FIG. 4 and/or information related to a scheduled reading taken at block 406 of FIG. 4) collected by the contact sensors 210c-d (block 516). As described above, data related to whether the hook 308 is in contact with the body 302 of the portable meter 110 is interpreted by the position detector 212 to indicate that the attachment mechanism is open or closed. In the illustrated example, the spring 310 biases the elongated arm 306 open. Thus, if the third interpretation indicates that the clip 300 is in an open position (block 518), the position detector 212 generates a signal to store a non-compliance value (e.g., a logic '0') in the memory 208 associated with the contact sensors 210c-d (block 520). Otherwise, if the first interpretation indicates that the clip 300 is in a closed open position (block 518), the position detector 212 generates a signal to store a compliance value (e.g., a logic '1') in the memory 208 associated with the contact sensors 210c-d (block 522). Irrespective of which type of value (e.g., non-compliance or compliance) is associated with the contact sensors 210c-d, a timestamp generated by the timestamp generator 216 is also stored in association with the contact sensors 210c-d in the memory 208 to indicate a date and/or time at which the first interpretation was performed by the position detector 212. Control then passes to FIG. 5B.

The compliance detector 214 uses the data generated by the position detector 212 to determine whether the most recent status information (e.g., position interpretation) associated with any one of the sensors 210a-d indicates that the portable meter 110 is or is not being worn (block 522). For example, the compliance detector 214 may determine the last time (e.g., using the timestamps stored in association with the sensors 210a-d as described above in connection with FIG. 5A) any sensor (e.g., the spring sensor 210a of FIG. 3A, the hinge sensor 210b, and/or the contact sensors 210c-d, or any other sensor disposed on the portable meter 110) indicated that the portable meter 110 was engaged (e.g., experienced an applied force) and/or worn by the panelist 122. In the illustrated example, if the time since the last indication of the portable meter 110 being worn from any sensor is greater than a threshold (block 524), the compliance detector 214 generates a non-compliance message (block 526). The non-compliance message can be conveyed (e.g., via the display 204 of FIG. 2, via an automatically generated email or letter, as a beep or other audio event, etc.) to the panelist 122 and/or to the media measurement entity that issued the portable meter 110. Alternatively, the non-compliance message may be stored and/or used to invalidate the audience measurement data associated with the meter 110 that was collected during the time period corresponding to the sensors indications of non-compliance. Invalidation of the data may include deletion of the data and/or flagging the data as, for example, not valid.

When the most recent status information associated with any of the sensors 210a-d is indicative of the meter 110 being worn (block 522) or, when the amount of time since the last indication that the meter 110 was being worn is less than the threshold discussed above (block 524), the compliance detector 214 in the illustrated example of FIGS. 5A-B determines a frequency of compliance indications for a given time period detected by the spring sensor 210a (block 528). This frequency is determined by, for example, summing the number of positive compliance indication occurring over a given period of time (e.g., the last hour using according to the timestamps discussed above). As described below, in the illustrated example, the spring sensor 210a acts as a primary sensor and the remaining sensors 210b-d act as secondary sensors to confirm, adjust, or rectify the readings taken by the primary sensor and/or the calculations made based on the primary sensor. In other examples, frequencies of compliance indications detected by any of the other sensors (e.g., the hinge sensor 210b or the contact sensors 210c-d) may be calculated instead of the spring sensor 210a and that other sensor may act as the primary sensor.

In the example of FIGS. 5A and 5B, the compliance detector 214 translates the frequency associated with the primary sensor (e.g., the spring sensors 210a in the example of FIGS. 5A-B) into a percentage according to, for example, a lookup table programmed into the compliance detector 214 (block 530). The values of the lookup table are based on, for example, an expected correlation (e.g., according to one or more previous studies) between frequency of determinations that the attachment mechanism 300 is in a position consistent with that of an attachment mechanism being worn by a person and the probability that the person is wearing the portable meter 110. In the illustrated example, the percentage acts as an initial representation of the likelihood that the portable device 110 is being worn. As described below, the percentage can be adjusted according to information gathered by the secondary sensors (the hinge sensor 210b and the contact sensors 210c-d in the example of FIGS. 5A-B) and analyzed by the distance comparator 212.

In particular, the compliance detector 214 analyzes the compliance indications detected by the secondary sensors 210b-d (block 532) for the same given period of time as in block 528. Similar to the determination made at block 528, the analyses of the information associated with the secondary sensors 210b-d includes determining a frequency of compliance indications generated by the position detector 212 corresponding to each of the secondary sensors 210b-d.

The compliance detector 214 then adjusts the likelihood percentage corresponding to the primary sensor in accordance with the information gathered by the secondary sensors 210b-d (block 534). In the illustrated example, the frequencies of positive compliance indications calculated at block 534 are used by the compliance detector 214 to increase or decrease the primary likelihood percentage according to a set of pre-programmed rules.

In the illustrated example, if the resulting adjusted likelihood generated at block 534 by the compliance detector 214 is below a threshold (block 536), the compliance detector 214 generates a message regarding the detection of non-compliance to be conveyed (e.g., via the display 204 of FIG. 2, via an automatically generated email or letter, as a beep or other audio event, etc.) to the panelist 122 and/or to the media measurement entity that issued the portable meter 110 (block 538). In the example of FIGS. 5A-B, the media measurement readings taken by the media detector 206 during a non-compliant time period are then not credited by skipping execution of block 540. In other examples, not crediting media measurement readings involves an affirmative action of deleting the media measurement data or marking the media measurement data as not valid. Otherwise, when the adjusted likelihood is greater than or equal to the threshold (block 536), media measurement readings taken by the media detector 206 during the corresponding period of time are credited as valid (block 540).

In some instances in which a cumulative or adjusted likelihood is not calculated (e.g., the individual likelihoods associated with each sensor 210a-d is treated independently), if any of the likelihoods associated with any of the sensors 210a-d exceed or meet a threshold (which is typically different from the threshold of block 536), the compliance detector 214 may credit the corresponding media measurement readings as valid.

After the non-compliance message is generated (block 538), or after crediting the audience measurement data (block 540), control returns to block 500, where the example machine readable instructions of FIGS. 5A-B may be repeated for another time period.

In alternative examples, frequencies of compliance indications may be determined for each of the sensors 210a-d. In such instances, none of the sensors 210a-d act as a primary sensor. Rather, all of the sensors 210a-d are treated equally in the likelihood calculation described below. For example, when all of the sensors 210a-d are treated equally, the compliance detector 214 may calculate a cumulative frequency of compliance (e.g., an average of the individual frequencies of compliance detected by each sensor 210a-d) according to each of the sensors 210a-d and then calculate a likelihood of compliance based on the cumulative frequency of compliance (e.g., according to a lookup table as described above).

Figure 7:
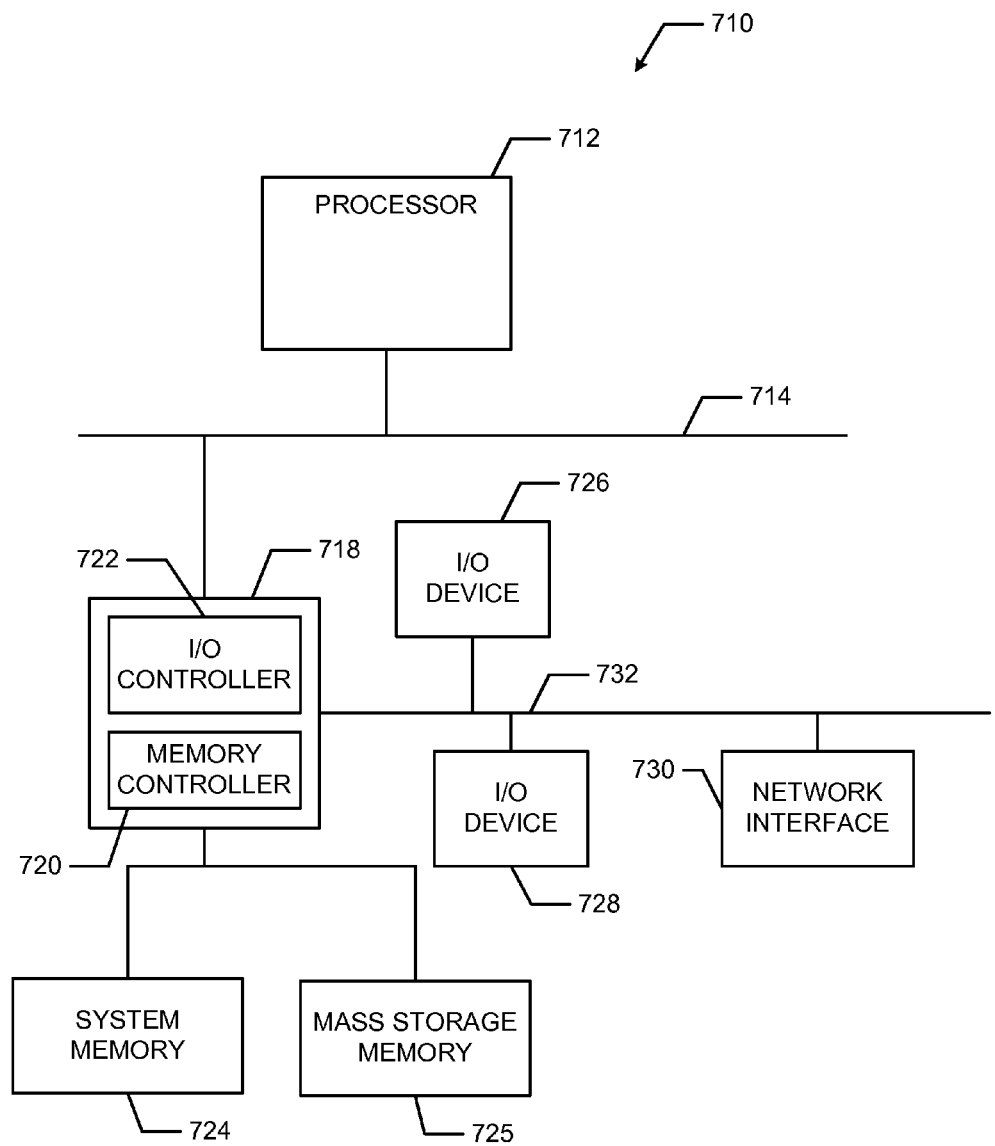
FIG. 7 is a block diagram of an example processor system that may be used to execute the machine readable instructions of FIGS. 4 and/or 5A and 5B to implement the example portable meter of FIG. 2.

FIG. 7 is a block diagram of an example processor system 710 that may be used to execute the instructions of FIGS. 4 and/or 5A-B to implement the example portable meter 110 of FIG. 2. As shown in FIG. 7, the processor system 710 includes a processor 712 that is coupled to an interconnection bus 714. The processor 712 may be any suitable processor, processing unit or microprocessor. Although not shown in FIG. 7, the system 710 may be a multi-processor system and, thus, may include one or more additional processors that are different, identical or similar to the processor 712 and that are communicatively coupled to the interconnection bus 714.

The processor 712 of FIG. 7 is coupled to a chipset 718, which includes a memory controller 720 and an input/output (I/O) controller 722. The chipset 718 provides I/O and memory management functions as well as a plurality of general purpose and/or special purpose registers, timers, etc. that are accessible or used by one or more processors coupled to the chipset 718. The memory controller 720 performs functions that enable the processor 712 (or processors if there are multiple processors) to access a system memory 724 and a mass storage memory 725.

The system memory 724 may include any desired type of volatile and/or non-volatile memory such as, for example, static random access memory (SRAM), dynamic random access memory (DRAM), flash memory, read-only memory (ROM), etc. The mass storage memory 725 may include any desired type of mass storage device including hard disk drives, optical drives, tape storage devices, etc.

The I/O controller 722 performs functions that enable the processor 712 to communicate with peripheral input/output (I/O) devices 726 and 728 and a network interface 730 via an I/O bus 732. The I/O devices 726 and 728 may be any desired type of I/O device such as, for example, a keyboard, a video display or monitor, a mouse, etc. The network interface 730 may be, for example, an Ethernet device, an asynchronous transfer mode (ATM) device, an 802.11 device, a DSL modem, a cable modem, a cellular modem, etc. that enables the processor system 710 to communicate with another processor system.

While the memory controller 720 and the I/O controller 722 are depicted in FIG. 7 as separate blocks within the chipset 718, the functions performed by these blocks may be integrated within a single semiconductor circuit or may be implemented using two or more separate integrated circuits.

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. A portable audience measurement device, comprising:
a housing;
a media detector in the housing to collect media exposure data;
a hinge including a hinge pin and having an arm to rotate in response to an applied force, the arm to secure the housing to an object associated with a person;
a rotation sensor to detect a magnitude of rotation of the arm relative to the housing, wherein the rotation sensor is coupled to the hinge pin, the rotation sensor including a rotary indicator to indicate the magnitude of rotation of the arm; and
a detector to compare the magnitude of rotation of the arm to a threshold angle to determine whether the device is being carried by the person.

2. The portable device as defined in claim 1, wherein the rotation sensor includes a light source and a photodetector, wherein the photodetector is to sense light conveyed from the light source through a pattern disc onto the photodetector.

3. The portable device as defined in claim 1, wherein the detector is to determine a likelihood that the device is being carried based on the comparison of the threshold angle and the magnitude of rotation of the arm.

4. The portable device as defined in claim 3, wherein the detector is to credit the media exposure data based on the likelihood.

5. The portable device as defined in claim 3, wherein the likelihood includes a primary likelihood based on information gathered by the rotation sensor, wherein the detector is to adjust the primary likelihood based on an output of a secondary sensor indicative of a position of the arm.

6. The portable device as defined in claim 5, wherein the secondary sensor includes a contact sensor to detect a closure of the arm.

7. A method of detecting wearing of a portable audience measurement device, comprising:
    detecting, using a rotation sensor coupled to a hinge pin, a magnitude of rotation of an arm associated with the hinge pin, the rotation sensor including a rotary indicator to indicate the magnitude of rotation of the arm;
    determining, via a logic circuit, whether the magnitude of rotation is indicative of the device being worn by a person based on a comparison of the magnitude of rotation of the arm to a threshold angle; and
    calculating, via the logic circuit, a likelihood that the device is being worn by the person based on a result of the comparison.

8. The method as defined in claim 7, wherein calculating the likelihood includes calculating a frequency of indications that the device is being worn by the person for a period of time.

9. The method as defined in claim 7, further including generating a message of non-compliance in response to determining that the likelihood is lower than a threshold likelihood.

10. The method as defined in claim 7, further including comparing a time of a last detected actuation of the hinge to a threshold amount of time in response to determining that the device is not being worn by the person.

11. The method as defined in claim 10, wherein a change in a status of the hinge as detected by the rotation sensor indicates actuation of the hinge by the person.

12. The method as defined in claim 10, further including generating a message of non-compliance in response to determining that the time is greater than the threshold amount of time.

13. The method as defined in claim 7, further including using the likelihood to determine whether collected media exposure information is to be credited.

14. The method as defined in claim 7, further including conveying the calculated likelihood to a central facility.

15. A tangible computing readable storage device or storage disc comprising instructions that, when executed, cause a machine to at least:
    detect a magnitude of rotation of an arm of a hinge of a portable device with a rotational sensor coupled to a hinge pin of the hinge, the rotation sensor including a rotary indicator to indicate the magnitude of rotation of the arm;
    determine whether the magnitude of rotation is indicative of the portable device being worn by a person based on a comparison of the magnitude of rotation of the arm to a threshold angle; and
    calculate a likelihood that the device is being worn by the person based on a result of the comparison.

16. The storage device or storage disc as defined in claim 15, wherein the instructions, when executed, cause the machine to calculate the likelihood by calculating a frequency of indications that the device is being worn by the person for a period of time.

17. The storage device or storage disc as defined in claim 15, wherein the instructions, when executed, cause the machine to generate a message of non-compliance in response to determining that the likelihood is lower than a threshold likelihood.

18. The storage device or storage disc as defined in claim 15, wherein the instructions, when executed, cause the machine to compare a time of a last detected actuation of the hinge to a threshold amount of time in response to determining that the arm is in a position indicating that the device is not being worn by the person.

19. The storage device or storage disc as defined in claim 18, wherein the instructions, when executed, cause the machine to generate a message of non-compliance in response to determining that the time is greater than the threshold amount of time.

20. The storage device or storage disc as defined in claim 15, wherein the instructions, when executed, cause the machine to use the likelihood to determine whether collected media exposure information is to be credited to the person.

21. The storage device or storage disc as defined in claim 15, wherein the instructions, when executed, cause the machine to convey the calculated likelihood to a central facility.

* * * * *